United States Patent
Lin et al.

(10) Patent No.: US 8,323,456 B2
(45) Date of Patent: Dec. 4, 2012

(54) REMOVAL OF BOUND WATER FROM BIO-OIL

(75) Inventors: Ronny W. Lin, Sugar Land, TX (US); Robert Bartek, Centennial, CO (US)

(73) Assignee: KiOR, Inc., Pasadena, TX (US)

( * ) Notice: Subject to any disclaimer, the term of this patent is extended or adjusted under 35 U.S.C. 154(b) by 0 days.

(21) Appl. No.: 12/869,395

(22) Filed: Aug. 26, 2010

(65) Prior Publication Data

US 2011/0139602 A1    Jun. 16, 2011

(51) Int. Cl.
B01D 3/36 (2006.01)
C07C 7/06 (2006.01)

(52) U.S. Cl. ............. 203/14; 203/59; 203/68; 203/69; 203/94; 203/98; 208/347; 210/774; 585/860; 585/867; 44/307; 201/3; 201/28

(58) Field of Classification Search ........... 203/14, 203/59, 68, 69, 94, 98; 44/307; 208/347; 210/774; 585/860, 867; 201/3, 28, 29
See application file for complete search history.

(56) References Cited

U.S. PATENT DOCUMENTS

| | | | |
|---|---|---|---|
| 4,204,915 A * | 5/1980 | Kurata et al. | 203/2 |
| 4,645,568 A * | 2/1987 | Kurps et al. | 203/14 |
| 4,942,269 A | 7/1990 | Chum et al. | |
| 5,371,212 A * | 12/1994 | Moens | 536/127 |
| 5,395,455 A | 3/1995 | Scott et al. | |
| 5,877,380 A | 3/1999 | Conroy et al. | |
| 6,485,841 B1 * | 11/2002 | Freel et al. | 428/498 |
| 7,319,168 B2 | 1/2008 | Sanada | |
| 7,998,315 B2 * | 8/2011 | Bridgwater et al. | 201/2.5 |
| 2008/0149896 A1 * | 6/2008 | Lenglet | 252/373 |
| 2008/0228021 A1 * | 9/2008 | Joensen et al. | 585/640 |
| 2009/0054711 A1 | 2/2009 | Lawrence et al. | |
| 2009/0082604 A1 * | 3/2009 | Agrawal et al. | 585/242 |
| 2009/0227766 A1 * | 9/2009 | Bridgwater et al. | 530/202 |
| 2010/0151550 A1 * | 6/2010 | Signes Nunez et al. | 435/165 |
| 2011/0139597 A1 * | 6/2011 | Lin | 201/4 |
| 2011/0146140 A1 | 6/2011 | Brandvold et al. | |
| 2011/0245489 A1 | 10/2011 | Steele et al. | |

FOREIGN PATENT DOCUMENTS

EP    0718392    6/1996

* cited by examiner

*Primary Examiner* — Virginia Manoharan
(74) *Attorney, Agent, or Firm* — Hovey Williams LLP

(57) ABSTRACT

A process and system for removing bound water from bio-oil by azeotropic distillation. The process includes combining a bound-water-containing bio-oil with an azeotrope agent and subjecting the resulting treated bio-oil to azeotropic distillation under reduced pressure. The azeotropic distillation removes a substantial portion of the bound water from the bio-oil, thus producing a water-depleted bio-oil that is less corrosive, more stable, and more readily miscible with hydrocarbons.

24 Claims, 1 Drawing Sheet

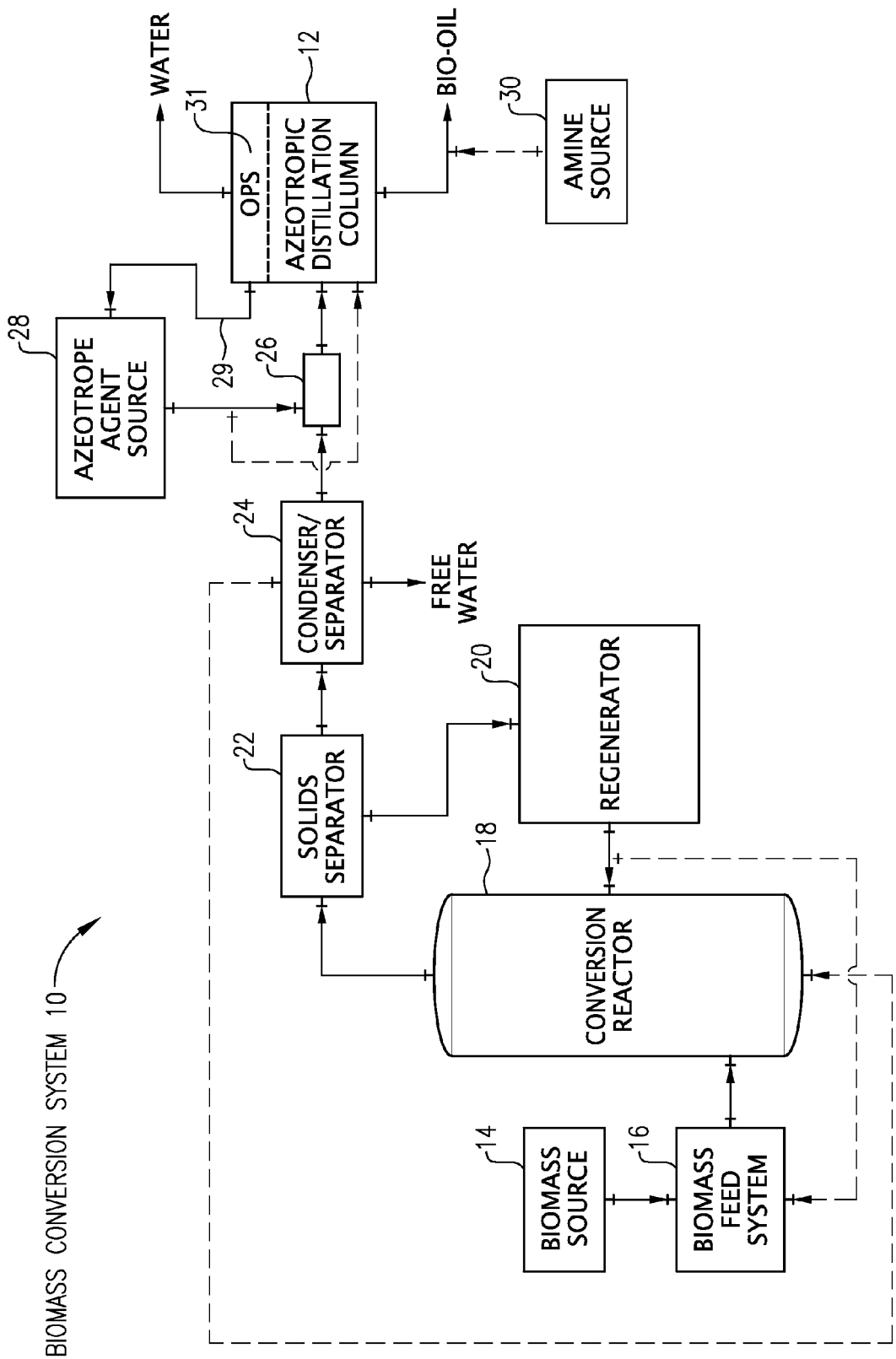

REMOVAL OF BOUND WATER FROM BIO-OIL

BACKGROUND

1. Field of the Invention

The present invention relates generally to the treatment of bio-oil. More specifically, the invention concerns processes and systems for reducing residual and bound water in bio-oil.

2. Description of the Related Art

With its low cost and wide availability, biomass has increasingly been emphasized as an ideal feedstock in alternative fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil."

Despite recent advancements in biomass conversion processes, many of the existing biomass conversion processes produce low quality bio-oils containing high amounts of bound water. "Bound water" is water that is physically and/or chemically bound within the bio-oil so that it does not naturally separate from the bio-oil. Bio-oils containing high amounts of bound water are not readily miscible with hydrocarbons due to their high polarity and, thus, require extensive secondary upgrading in order to be utilized as transportation fuels, petrochemicals, and/or specialty chemicals. Additionally, the bound water in these low quality bio-oils tends to increase the amount of organic acids present in the bio-oil, thus increasing its corrosive nature and diminishing its ability to be stored over long periods of time. Furthermore, these low quality bio-oils tend to readily degrade over time due to polymerization of the bio-oil caused by its highly corrosive nature.

Bio-oils may be subjected to various separation processes in order to remove bound water. These processes, which have utilized distillation columns and/or molecular sieves, expose the bio-oil to unfavorable conditions in order to extract bound water. Such conditions facilitate polymerization of the bio-oil, thus increasing its viscosity and lowering its usefulness as a fuel. Consequently, previous separation processes have degraded bio-oils in the attempt to remove bound water.

Accordingly, there is a need for an improved process and system for removing bound water from bio-oil.

SUMMARY OF THE INVENTION

In one embodiment, the present invention is directed to a bio-oil treatment process comprising the steps of (a) combining a bio-oil comprising bound water with an azeotrope agent to thereby provide a treated bio-oil, wherein the azeotrope agent comprises one or more $C_6$-$C_{10}$ water-insoluble hydrocarbons, and (b) subjecting the treated bio-oil to azeotropic distillation in an azeotropic distillation column to thereby provide a water-rich overhead stream and a water-depleted bio-oil stream. The water-rich overhead stream comprises at least 75 weight percent of the bound water originally present in the bio-oil.

In another embodiment, the present invention is directed to a bio-oil treatment process comprising the steps of (a) separating a biomass conversion product into a free water phase and a bio-oil phase, wherein the bio-oil phase comprises at least 1 weight percent of bound water; (b) removing the free water phase from the bio-oil phase; (c) combining the bio-oil phase with an azeotrope agent to thereby provide a treated bio-oil; (d) subjecting the treated bio-oil to azeotropic distillation in an azeotropic distillation column to thereby provide a water-rich overhead stream and a water-depleted bio-oil stream; and (e) recovering at least a portion of the azeotrope agent from the azeotropic distillation column and recycling at least a portion of the recovered azeotrope agent for use in step (c). During step (d), the azeotropic distillation is carried out at a top column pressure below atmospheric pressure and a bottom column temperature below 140° C.

In a further embodiment, the present invention is directed to a bio-oil producing system comprising a biomass feedstock source for providing solid particulate biomass; a conversion reactor for thermally converting at least a portion of the biomass feedstock into a conversion product comprising condensable vapors; a condenser for condensing at least a portion of the condensable vapors into a free water phase and a bio-oil phase comprising bound water; a separator for removing at least a portion of the free water phase from the bio-oil phase; an azeotrope injector for introducing an azeotrope agent into at least a portion of said bio-oil phase to thereby produce a treated bio-oil; an azeotropic distillation column for separating the treated bio-oil into a water-depleted stream and a water-rich overhead stream; and an azeotrope agent transport mechanism for transporting at least a portion of the azeotrope agent from the azeotropic distillation column to the azeotrope injector.

BRIEF DESCRIPTION OF THE FIGURES

Embodiments of the present invention are described herein with reference to the following drawing FIGURE, wherein:

FIG. 1 is a schematic diagram of a biomass conversion system according to one embodiment of the present invention.

DETAILED DESCRIPTION

FIG. 1 depicts a biomass conversion system 10 that employs an azeotropic distillation column 12 to remove excess water from bio-oil. It should be understood that the biomass conversion system shown in FIG. 1 is just one example of a system within which the present invention can be embodied. The present invention may find application in a wide variety of other systems where it is desirable to efficiently and effectively remove water from bio-oil. The exemplary biomass conversion system illustrated in FIG. 1 will now be described in detail.

The biomass conversion system 10 of FIG. 1 includes a biomass source 14 for supplying a biomass feedstock to be converted to bio-oil. The biomass source 14 can be, for example, a hopper, storage bin, railcar, over-the-road trailer, or any other device that may hold or store biomass. The biomass supplied by the biomass source 14 is preferably in the form of solid particles having a minimum particle size of 200, 100, or 50 microns and a maximum particle size of 2,000, 1,000, or 750 microns. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 14 can be supplied to a biomass feed system 16. The biomass feed system 16 can be any system capable of feeding solid particulate biomass to a biomass conversion reactor 18. While in the biomass feed system 16, the biomass material may undergo a number of pretreatments to facilitate the subsequent conversion reactions. Such pretreatments may include drying, roasting, torrefaction, demineralization, steam explosion, mechanical agitation, impregnation with acids, bases, or salts, and/or any combination thereof.

In one embodiment, it may be desirable to combine the biomass with a catalyst in the biomass feed system 16 in order to promote conversion of the biomass to the desired bio-oil product. Alternatively, the catalyst may be introduced directly into the conversion reactor 18. The catalyst may be fresh or be regenerated catalyst from the regenerator 20. The catalyst can, for example, comprise a solid acid, such as a zeolite. Examples of suitable zeolites include ZSM-5 and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcites, hydrotalcite-like materials, clays, and/or combinations thereof. As used herein, the term "hydrotalcite-like materials" refers to materials having the structure of hydrotalcite, but wherein the divalent metal is not Mg and/or the trivalent metal is not Al. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 18, they are not considered catalysts.

The biomass feed system 16 introduces the biomass material into a conversion reactor 18. In the conversion reactor 18, biomass is subjected to a conversion reaction that produces bio-oil. The conversion reactor 18 can facilitate different chemical conversion reactions such as fast pyrolysis, slow pyrolysis, liquefaction, gasification, or enzymatic conversion. The conversion reactor 18 can be, for example, a fluidized bed reactor, a cyclone reactor, an ablative reactor, or a riser reactor.

In one embodiment, the conversion reactor 18 can be a riser reactor and the conversion reaction is fast pyrolysis. As used herein, "pyrolysis" refers to the chemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, product gas recycled from the biomass conversion process, or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

The product exiting the conversion reactor 18 generally comprises gas, vapors, and solids. In the case of fast pyrolysis, the solids in the product exiting the conversion reaction generally comprise particles of char, ash, and/or catalyst. As depicted in FIG. 1, the product from the conversion reactor 18 can be introduced into a solids separator 22. The solids separator 22 can be any conventional device capable of separating solids from gas and vapors such as, for example, a cyclone separator or a gas filter. The solids separator 22 removes a substantial portion of the solids (e.g., spent catalysts, char, and/or heat carrier solids) from the reaction product. The solid particles recovered in the solids separator 22 are introduced into a regenerator 20 for regeneration, typically by combustion. After regeneration, the hot regenerated solids can be reintroduced directly into the conversion reactor 18 and/or combined with the biomass feed upstream of the conversion reactor 18.

The remaining gas/vapor phase conversion products from the solids separator 22 are introduced into a condenser/separator 24. The condenser/separator 24 condenses at least a portion of the vapor products into bio-oil, while the noncondensable gas and uncondensed vapor are drawn off in a separate stream. The noncondensable gas recovered from the condenser/separator 24 may be recycled as a lift gas in the biomass conversion reactor 18.

In one embodiment, the condensed bio-oil in the condenser/separator 24 undergoes natural phase separation upon condensing and forms a free water phase and a bio-oil phase comprising bound water. In another embodiment, the condensed bio-oil in the condenser/separator 24 does not undergo natural phase separation upon condensing and only forms a bio-oil comprising bound water.

As used herein, "bound water" refers to water that is physically and/or chemically bound within the bio-oil and does not naturally separate from the bio-oil. As used herein, "free water" refers to the water produced during the biomass conversion reaction that naturally separates from the bio-oil phase upon condensing. This water is derived from the biomass conversion process (e.g., from steam used as a lift gas, water removed from the biomass during the process, or water produced during the dehydration reactions). Typically, the free water phase is in excess of the bio-oil produced. The oxygen content of the produced bio-oil has a great influence on whether the free water phase forms and readily separates from the bio-oil phase. If a produced bio-oil contains low amounts of oxygen (e.g., less than about 35 percent by weight), then the free water phase naturally forms and separates from the bio-oil phase. However, the free water phase will not form and naturally separate from a produced bio-oil with high oxygen content (e.g., greater than 35 percent by weight) due to the high polarity of the bio-oil. In such a case, the free water will be soluble in the highly oxygenated bio-oil and will not naturally separate due to the formation of polar bonds between the water and the bio-oil.

Referring again to FIG. 1, if a free water phase is formed subsequent to condensing, then the free water phase and the bio-oil phase comprising bound water are separated in the condenser/separator 24 and discharged from the condenser/separator 24 as separate streams. Typically, the bio-oil phase discharged from the condenser/separator 24 comprises at least 1, 5, or 10 weight percent bound water, but not more than 50 weight percent bound water.

In one embodiment, the bio-oil comprising bound water discharged from the condenser/separator 24 is transported to a mixing zone 26 and an azeotrope injector introduces an azeotrope agent from an azeotrope agent source 28 into said mixing zone 26 to thereby form a treated bio-oil that is subsequently introduced into the azeotropic distillation column 12. In an alternative embodiment, the mixing zone 26 is not used to combine the bio-oil and the azeotrope agent. When the mixing zone 26 is not used, the bio-oil comprising bound water is introduced directly into the azeotropic distillation column 12 and an azeotrope injector introduces the azeotrope agent directly into the azeotropic distillation column 12, so that the bio-oil and azeotrope agent combine inside the azeotropic distillation column 12 to form the treated bio-oil.

The amount of azeotrope agent added to the bio-oil can be at least 1, 3, 5, or 10 weight percent of the bio-oil comprising bound water, but not more than 20, 40, 60, or 80 weight percent of the bio-oil comprising bound water. The azeotrope agent can be a non-polar solvent that is generally comprised of one or more $C_6$-$C_{10}$ water-insoluble hydrocarbons. In one embodiment, the $C_6$-$C_{10}$ water-insoluble hydrocarbons are aromatic hydrocarbons. Examples of suitable $C_6$-$C_{10}$ water-insoluble aromatic hydrocarbons include toluene, xylene, naphthalene, and/or benzene. As discussed below, at least a portion of the $C_6$-$C_{10}$ water-insoluble hydrocarbons used as the azeotrope agent can be derived from the bio-oil.

The bio-oil and azeotrope agent mixture ("treated bio-oil") introduced into or formed within the azeotropic distillation column 12 is subjected to azeotropic distillation therein. During azeotropic distillation, a water-rich overhead stream and a water-depleted bio-oil stream are produced. The water-rich overhead stream comprises at least 75, 85, 90, or 95 weight percent of the bound water originally present in the bio-oil.

As used herein, "water-rich" and "water-depleted" refer to the water content of the separated streams relative to the water content of the original stream from which the separated streams are derived. Thus, a water-rich stream contains a greater molar concentration of water than the stream from which it is derived, while a water-depleted stream contains a lesser molar concentration of water than the stream from which it is derived. In this present case, the water-rich overhead stream exiting the azeotropic distillation column 12 contains a higher molar concentration of water than the treated bio-oil stream fed to the azeotropic distillation column 12, while the water-depleted stream exiting the bottom of the azeotropic distillation column 12 contains a lower molar concentration of water than the treated bio-oil stream fed to the azeotropic distillation column 12.

The azeotropic distillation is carried out at lower temperatures and pressures than exist in many conventional processes for removing bound water from bio-oil. In particular, the azeotropic distillation is carried out at a top column pressure that is not more than atmospheric pressure, 750 mmHg, 500 mmHg, or 250 mmHg. Furthermore, the azeotropic distillation can be carried out at a bottom column temperature that is not more than 140° C., 130° C., or 120° C.

The azeotropic distillation column 12 can be provided with an overhead phase separator 31 for recovering the azeotrope agent in relatively pure form. The recovered azeotrope agent can be withdrawn from the overhead phase separator 31 of the distillation column 12 through an outlet 29, optionally combined with fresh azeotrope agent, and transported to the azeotrope injector for reintroduction into bio-oil comprising bound water. As previously mentioned, the azeotrope injector can introduce the azeotrope agent into the mixing zone 26 and/or directly into the bottom of the azeotropic distillation column 12. Additionally, or alternatively, C6-C10 water-insoluble hydrocarbons may be recovered from the water-depleted bio-oil stream exiting the bottom of the azeotropic distillation column 12 and can then be recycled for use as at least a portion of the azeotrope agent.

The water-depleted bio-oil stream removed from the bottom of the azeotropic distillation column 12 has undergone little degradation (polymerization) as a result of the azeotropic distillation and is readily miscible with hydrocarbons when compared to the bio-oil comprising bound water prior to azeotropic distillation. Accordingly, the water-depleted bio-oil exiting the bottom of the azeotropic distillation column 12 can exhibit a kinematic viscosity (ASTM D445-09) that is not more than 400 centistokes greater than the kinematic viscosity (ASTM D455-09) of the bio-oil comprising bound water that exits the condenser/separator 24.

The azeotropic distillation of the current process also decreases the amount of organic acids present in the water-depleted bio-oil exiting the bottom of the azeotropic distillation column 12 relative to the bio-oil comprising bound water that exits the condenser/separator 24. Consequently, the water-depleted bio-oil is less corrosive as it contains fewer organic acid groups relative to the bio-oil comprising bound water. The water-depleted bio-oil may have, for example, a Total Acid Number (TAN) value of less than 60 mg KOH/g.

If necessary, the water-depleted bio-oil may be mixed with an amine from the amine source 30 in order to further supplement the stability of the bio-oil. The amine can include. $NH_3$ or any other amine known in the art that may stabilize a bio-oil. The amount of amine used is minimized and only so much is used so as to inhibit the remaining corrosive nature of the water-depleted bio-oil.

EXAMPLES

Example 1

A bio-oil was produced using fast pyrolysis in a riser reactor in the presence of a zeolite catalyst. Subsequent to condensing, the bio-oil had a bound water content of 4.16 weight percent after removal of the free water phase and a TAN value of 15.01 mg KOH/g. The bio-oil (134.8 g) was subjected to azeotropic distillation in the presence of 34 g of toluene at a pressure of about 230 mmHg and a maximum temperature of 110° C. After azeotropic distillation and removing distilled water from an overhead Dean-Stark trap, the bio-oil had a bound water content of 0.03 weight percent, a TAN value of 10.61 mg KOH/g, and was miscible with about 10 weight percent of toluene in solution.

Example 2

A bio-oil was produced using fast pyrolysis in a riser reactor in the presence of a kaolin catalyst. Subsequent to condensing, the bio-oil had a bound water content of 9.99 weight percent after removal of the free water phase and a TAN value of 110.14 mg KOH/g. The bio-oil (166 g) was subjected to azeotropic distillation in the presence of 40.6 g of toluene at a pressure of about 210 mmHg and a maximum temperature of 105.3° C. After azeotropic distillation, the bio-oil had a bound water content of 0.22 weight percent, a TAN value of 55.14 mg KOH/g, and was miscible with about 10 weight percent of toluene.

Example 3

A bio-oil with an oxygen content of 17 weight percent was produced using fast pyrolysis in a riser reactor with a zeolite catalyst. Subsequent to condensing, the bio-oil had a bound water content of 6.82 weight percent after removal of the free water phase and a TAN value of 34.74 mg KOH/g. The bio-oil (141 g) was subjected to azeotropic distillation in the presence of 38 g of toluene at a pressure of about 240 mmHg and a maximum temperature of 107.7° C. After azeotropic distillation, the bio-oil had a bound water content of 0.05 weight percent, a TAN value of 24.71 mg KOH/g, and was miscible with about 10 weight percent of toluene.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any process or system not materially departing from but outside the literal scope of the invention as set forth in the following claims.

What is claimed is:

1. A process for producing bio-oil, said process comprising:
   (a) combining a bio-oil comprising bound water with an azeotrope agent to thereby provide a treated bio-oil, wherein said azeotrope agent comprises one or more $C_6$-$C_{10}$ water-insoluble hydrocarbons;
   (b) subjecting said treated bio-oil to azeotropic distillation in an azeotropic distillation column to thereby provide a water-rich overhead stream and a water-depleted bio-oil stream, wherein said water-rich overhead stream comprises an azeotrope of water and said azeotrope agent, wherein said water-rich overhead stream comprises at least 75 weight percent of the bound water originally present in said bio-oil; and
   (c) subsequent to step (b), adding an amine to said water-depleted bio-oil stream.

2. The process of claim 1 wherein said azeotrope agent comprises toluene.

3. The process of claim 1 wherein said azeotropic distillation is carried out at a top column pressure below atmospheric pressure and at a bottom column temperature below 140° C.

4. The process of claim 1 wherein said azeotropic distillation is carried out at a top column pressure below 750 mmHg and a bottom column temperature below 130° C.

5. The process of claim 1 wherein at least a portion of said azeotrope agent is derived from said water-depleted bio-oil stream.

6. The process of claim 1, further comprising, subsequent to step (b), recovering at least a portion of said azeotrope agent from said water-rich overhead stream using an overhead phase separator of said azeotropic distillation column for separating said azeotrope agent and said water present in said azeotrope and recycling at least a portion of the recovered azeotrope agent for use in step (a).

7. The process of claim 1 wherein the viscosity of said water-depleted bio-oil stream is not more than 400 centistokes greater than the viscosity of said bio-oil comprising bound water.

8. The process of claim 1 wherein said combining of step (a) takes place within said azeotropic distillation column.

9. The process of claim 1 wherein said water-depleted bio-oil stream comprises less organic acids than said bio-oil comprising bound water.

10. The process of claim 1 wherein said water-depleted bio-oil stream has a Total Acid Number (TAN) of less than 60 mgKOH/g.

11. A process for producing bio-oil, said process comprising:
   (a) separating a biomass conversion product into a free water phase and a bio-oil phase, wherein said bio-oil phase comprises at least 1 weight percent of bound water and less than about 35 weight percent of oxygen;
   (b) removing said free water phase from said bio-oil phase;
   (c) combining said bio-oil phase with an azeotrope agent to thereby provide a treated bio-oil;
   (d) subjecting said treated bio-oil to azeotropic distillation in an azeotropic distillation column to thereby provide a water-rich overhead stream and a water-depleted bio-oil stream, wherein said water-rich overhead stream comprises an azeotrope of water and said azeotrope agent, wherein said azeotropic distillation is carried out at a top column pressure below atmospheric pressure and a bottom column temperature below 140° C.;
   (e) recovering at least a portion of said azeotrope agent from said water-rich overhead stream; and
   (f) recycling at least a portion of the recovered azeotrope agent for use in step (c).

12. The process of claim 11 wherein said azeotrope agent is selected from the group consisting of toluene, xylene, naphthalene, benzene and combinations thereof.

13. The process of claim 11 wherein said water-rich overhead stream comprises at least 90 weight percent of the bound water, wherein the amount of said azeotrope agent combined in step (c) with said bio-oil phase is at least 1 weight percent of said bio-oil phase and not more than 60 weight percent of said bio-oil phase.

14. The process of claim 11 wherein said combining of step (c) takes place within said azeotropic distillation column or upstream of said azeotropic distillation column.

15. The process of claim 11 wherein said azeotrope agent comprises at least one $C_6$-$C_{10}$ water-insoluble hydrocarbon.

16. The process of claim 11 wherein said azeotrope agent comprises toluene.

17. The process of claim 11 wherein said top column pressure is less than 750 mmHg and said bottom column temperature is below 130° C., wherein the viscosity of said water-depleted bio-oil stream is not more than 400 centistokes greater than the viscosity of said bio-oil comprising bound water.

18. The process of claim 11 wherein said water-depleted bio-oil stream comprises less organic acids than said bio-oil phase.

19. The process of claim 11 wherein said water-depleted bio-oil stream has a Total Acid Number (TAN) of less than 60 mgKOH/g.

20. The process of claim 11 wherein said recovering of step (e) is carried out in a phase separator for separating said azeotrope agent and said water present in said azeotrope.

21. A process for producing bio-oil, said process comprising:
   (a) separating a biomass conversion product into a free water phase and a bio-oil phase, wherein said bio-oil phase comprises at least 1 weight percent of bound water;
   (b) removing said free water phase from said bio-oil phase;
   (c) combining said bio-oil phase with an azeotrope agent to thereby provide a treated bio-oil;
   (d) subjecting said treated bio-oil to azeotropic distillation in an azeotropic distillation column to thereby provide a water-depleted bio-oil stream and a water-rich overhead stream comprising an azeotrope of water and said azeotrope agent, wherein said azeotropic distillation is carried out at a top column pressure below atmospheric pressure and a bottom column temperature below 140° C.;
   (e) recovering at least a portion of said azeotrope agent from said water-rich overhead stream, wherein said azeotropic distillation column includes an overhead phase separator through which the recovered azeotrope agent is separated from said azeotrope and withdrawn during step (e); and (f) recycling at least a portion of the recovered azeotrope agent for use in step (c).

22. The process of claim 21 wherein said azeotrope agent comprises at least one $C_6$-$C_{10}$ water-insoluble hydrocarbon.

23. The process of claim 21 wherein said azeotrope agent comprises toluene.

24. A system for producing a bio-oil, said system comprising:

a biomass feedstock source for providing solid particulate biomass;

a conversion reactor for thermally converting at least a portion of said biomass feedstock into a conversion product comprising condensable vapors;

a condenser for condensing at least a portion of said condensable vapors into a free water phase and a bio-oil phase comprising bound water;

a separator for removing at least a portion of said free water phase from said bio-oil phase;

an azeotrope injector for introducing an azeotrope agent into at least a portion of said bio-oil phase to thereby produce a treated bio-oil;

an azeotropic distillation column for separating said treated bio-oil into a water-depleted bio-oil stream and a water-rich overhead stream comprising an azeotrope of water and said azeotrope agent;

a phase separator for separating said water and said azeotrope agent present in said azeotrope; and an azeotrope agent transport mechanism for transporting at least a portion of said azeotrope agent from said phase separator to said azeotrope injector.

\* \* \* \* \*